# 2,970,140
PROCESS FOR PREPARING AMINO ETHERS OF STARCH

Clifford H. Hullinger and Naoyuki H. Yui, Chicago, Ill., assignors to American Maize-Products Company, a corporation of Maine
No Drawing. Filed Aug. 9, 1957, Ser. No. 677,228
4 Claims. (Cl. 260—233.3)

This invention relates to the manufacture of starch derivatives having nitrogen or nitrogen-containing groups chemically bound to the starch molecules. A characterizing feature of the invention is that our starch derivative is produced in the form of granules which are cationic and capable of assuming a positive charge in acid or neutral environment. The invention is further characterized by the fact that the cationic starch granules of our invention will paste in water at low temperature to form a highly viscous, clear, cohesive paste which shows very little gel formation on standing.

The present application is based on our discovery that dialkylaminoalkyl halides which have an amino group in the beta position are so highly reactive with starch that reaction may be carried out in aqueous slurry under controlled conditions of alkalinity without pasting the starch granules. The high degree of reactivity of our halogen alkylamines is attributed to the beta position of the amino group and to the fact that we employ a dialkyl amine. We have been unable to achieve reaction with our controlled conditions of alkalinity when more than two carbons separate the halide from the nitrogen or when either of the alkyl groups on the nitrogen atom is replaced by hydrogen.

The dialkylaminoalkyl halides which are useful for carrying out our reaction may be defined as those having the general formula

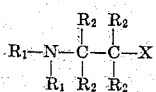

In the formula, $R_1$ may be any $C_1$–$C_{18}$ alkyl group or $C_1$–$C_{18}$ substituted alkyl group containing one or more halogen atoms, ester, ether, acetal, or non-reactive amine group and $R_2$ may be hydrogen or any $C_1$–$C_{18}$ alkyl group or $C_1$–$C_{18}$ substituted alkyl group containing one or more halogen atoms, ester, ether, acetal, or non-reactive amine group. It is to be understood that the alkyl groups need not all be the same and may be different from one another. X may be any halide such as chlorine, bromine or iodine. Some of the dialkyl-aminoalkyl halides which are particularly useful in carrying out our invention include dimethylaminoethyl chloride, diisopropylaminoethyl chloride, diethylaminoethyl bromide. The dialkylaminoalkyl halide may be in the form of the free base or the salt thereof such as the dimethylaminoethyl chloride hydrochloride, diethylaminoethyl bromide hydrobromide etc. and as used herein the term dialkylaminoalkyl halides is intended to include the free base and the salts thereof.

The reaction between our amine reagents and starch may be represented as follows:

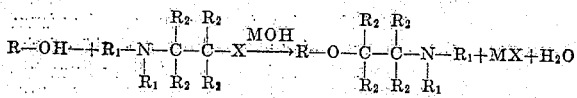

In the formula R represents a starch molecule and OH is an etherifiable hydroxy group on the starch molecule. MOH is an alkali reagent (later defined) which is a reactant as well as a catalyst and the amine reagent is as defined hereinabove.

The amount of dialkylaminoalkyl halide which may be employed without pasting the starch granules during reaction in aqueous slurry under alkaline conditions will vary depending upon the degree of substitution, alkalinity of the slurry and the temperature at which the reaction is carried out. We limit the amount of amine reagent to a maximum of about 0.11 mol of dialkylaminoalkyl halide for each mol of dry starch ($C_6H_{10}O_5$) solids in the reaction slurry and at this concentration we achieve a starch granule containing about 0.07 mol dialkylaminoalkyl group for each $C_6H_{10}O_5$ unit of the starch granule. Throughout the specification the term "mol of starch" is intended to mean that each mol consists of one mol of $C_6H_{10}O_5$ units.

This maximum amount of amine reagent is specified for the lower end of the range hereinafter given for slurry alkalinity and reaction temperature. If more than the specified maximum amount of amine reagent is employed difficulties may be experienced in separating the starch granules from the reaction slurry. For best results in commercial operations we prefer to limit the amount of amine reagent to about 0.07 mol for each mol of dry starch solids which gives a starch granule with a degree of substitution (DS) of about 0.05 dialkylaminoalkyl group for each $C_6H_{10}O_5$ unit. There is no limit to the minimum amount of amine reagent that may be employed which ranges all the way down to just above zero. Starch granules of extremely low DS formed by reacting starch granules with just 0.0001 mol of amine reagent per mol of starch have commercial utility.

Control of the alkalinity of the starch reaction slurry is extremely important and for our purpose of producing cationic starch granules the pH of the reaction slurry is maintained between about 8.0 to 12.0 and for ease of processing the starch in commercial operation we prefer to maintain the pH between about 9.0 to 11.5. If the pH of the reaction slurry is below a pH of 8.0, then reaction will not occur or it will take place so slowly that the process is of no great practical commercial value. On the other hand if the pH of the slurry exceeds 12.0 then the starch will paste and our cationic starch granules will not be achieved. The maximum pH of 12.0 for the aqueous reaction slurry would be used at the low end of the range specified herein for the amine reagent and reaction temperature. As brought out in the examples we employ between about 0.04 to about 0.12 mol of alkali for each mol of starch. Since the alkali is used up during reaction, alkali may be added as the reaction proceeds provided the free alkali (alkalinity) of the reaction slurry does not at any given time during reaction exceed the specified pH values. Adjustment of amount of amine reagent, reaction temperature and alkalinity within the specified range is well within the knowledge of one having ordinary skill in the art.

The alkali reagents which may be used in carrying out our reaction include alkali metal hydroxides and water-soluble alkaline earth hydroxides and while these give the best results, other bases may also be used such as ammonium hydroxide and organic bases such as quaternary ammonium hydroxides (trimethylbenzyl ammonium hydroxide, triethylbenzyl ammonium hydroxide, etc.) and amine bases like the mono-di-tri tertiary amines (butyl amine, ethylenediamine, diethylenetriamine) and substituted mono-di-tri tertiary amines such as ethanol amines and dichloroethyl amines and such basic salts as trisodium phosphate, etc.

The pH range specified hereinabove is given for a starch slurry containing between about 10% to 42% dry starch solids by weight which is the range of starch slurry concentration which may ordinarily be employed in commercial manufacture of starch.

As to temperature of reaction, the temperature determines speed of reaction and the temperature must of course be below that at which the starch under a given set of reaction conditions will paste. For this purpose the temperature of the slurry must be below 160° F. and in order to have the reaction proceed the temperature of the starch reaction slurry should be held above the freezing point of water (32° F.). Best results are achieved in commercial practice with a reaction temperature between about 80° F. and 120° F.

Any of the known commercial granular starches may be employed in the manufacture of our cationic starch granules such as corn, wheat and sorghum cereal starches, potato and arrowroot starches and the more expensive waxy corn and tapioca starches may also be employed as well as modified starches containing etherifiable hydroxyl groups such as acid treated or oxidized thin boiling starches. Preparation of such modified starches are well known in the art.

Briefly stated the present process is carried out by reacting starch granules in aqueous slurry with a beta dialkylaminoalkyl halide in the presence of a strong alkali in an amount to establish alkalinity of the reaction slurry at a pH between about 8.0 and 12.0. During reaction the slurry is preferably agitated to keep the starch granules in suspension and the reaction is carried out below the pasting point of the starch granules. Reaction takes place in about 2 to 20 hours depending upon the temperature. After reaction, the slurry is neutralized with a suitable acid to a pH below 9.0 and the starch granules are dewatered, washed and then dried in conventional manner.

Details of the reaction are best understood by reference to the following specific examples:

EXAMPLE I 500 grams (dry basis) of corn starch granules were slurried in 700 ml. of water and the pH of the reaction slurry was adjusted to 11.0 with sodium hydroxide. (0.1 mol of alkali for each mol of starch.) The slurry was then warmed to 120° F. and then 20 gms. of beta dimethylaminoethyl chloride hydrochloride were added (0.045 mol amine for each mol of starch) and reaction allowed to proceed about 2 hours at 120° F. The slurry was neutralized with phosphoric acid to a pH of about 4.5 and the starch granules were dewatered by filtration, washed and dried. Cationic starch granules were recovered in original unswollen form.

EXAMPLE II

Four hundred grams (dry basis) of corn starch granules were slurried in 700 ml. of water and heated to 120° F. 16 grams of calcium hydroxide (0.088 mols of alkali per mol starch) were added followed by 16 grams of beta-diethylaminoethyl chloride hydrochloride. The slurry pH was 11.5. The slurry was gently agitated with stirring for about 10 hours at 100° F. and it was then neutralized with hydrochloric acid to a pH of about 5.0. The slurry was filtered and the cationic starch granules were thereafter washed and dried.

EXAMPLE III

The procedure, ingredients and amounts of ingredients specified in Example II were used with the exception that 8.0 grams of calcium hydroxide and 6.8 grams of beta-dimethylaminoethyl chloride hydrochloride were used in place of the alkali reagent and diethylaminoethyl chloride hydrochloride of Example II.

EXAMPLE IV

The procedure, ingredients and amounts of ingredients specified in Example II were used with the exception that 8.0 grams of calcium hydroxide and 7.34 grams of beta-dimethyl aminoisopropyl chloride hydrochloride were used in place of the alkali reagent and diethylaminoethyl chloride hydrochloride of Example II.

EXAMPLE V

The procedure, ingredients and amounts of ingredients specified in Example II were used with the exception that 8.0 grams of calcium hydroxide and 9.3 grams of beta-diisopropylaminoethyl chloride hydrochloride were used in place of the alkali reagent and diethylaminoethyl chloride hydrochloride of Example II.

EXAMPLE VI

The procedure, ingredients and amounts of ingredients specified in Example II were used with the exception that waxy corn starch granules were used in place of corn starch.

EXAMPLE VII 1500 grams (dry basis) of corn starch granules were slurried in 2300 ml. water and the slurry was then heated to 80° F. Thereafter 430 ml. of 0.5 N sodium hydroxide were added (0.023 mol alkali for each mol of starch) followed by 10 grams of beta-diethylaminoethyl chloride hydrochloride. After reaction had proceeded for one half hour 215 ml. of 0.5 N sodium hydroxide were added followed by an additional 10 grams of beta-diethylaminoethyl chloride hydrochloride. The addition of 215 ml. of 0.5 N sodium hydroxide followed by 10 grams of the amine was continued at half hour intervals until a total of 60 grams of the amine had been added to the starch slurry. Total alkali was 0.093 mol alkali for each mol of starch and total amine was 0.038 mol beta diethylaminoethyl chloride hydrochloride for each mol of starch. By adding the alkali in successive steps pH of the slurry was maintained below 11.5 throughout the reaction period. Reaction was continued for 2 hours after the last addition of amine. The slurry was then neutralized with sulfuric acid to a pH of about 5 and the starch granules were dewatered by filtration, washed and dried.

EXAMPLE VIII 2500 grams (dry basis) of commercial 90 thin boiling corn starch granules were slurried in 4200 ml. of water and gently heated to 120° F. Thereafter 100 grams of calcium hydroxide (0.087 mol alkali for each mol starch) were added followed by 100 grams of beta diethylaminoethyl chloride hydrochloride (0.0388 mol for each mol of starch). pH of the reaction slurry was 11.5. Reaction was allowed to proceed for two hours at 130° F. and then the slurry pH was adjusted with hydrochloric acid to a value of 4.5. The cationic starch granules were dewatered, washed and dried. Analysis showed 0.229% by weight of added nitrogen giving a degree of substitution of about 0.0266.

EXAMPLE IX 400 grams (dry basis) of corn starch granules were slurried in 700 ml. water at ordinary room temperature (75° F.). Thereafter 16.0 grams of calcium hydroxide were added (0.088 mol Ca(OH)$_2$ for each mol of starch) followed by 16.0 grams of beta diethylaminoethyl chloride hydrochloride. pH of the reaction slurry was 11.5. After two hours at room temperature the slurry pH was adjusted with hydrochloric acid to about pH 5.0 and then the cationic starch granules were dewatered, washed and dried. The cationic starch granules contained 0.131% by weight of added nitrogen for a degree of substitution of about 0.0153.

EXAMPLE X 1000 grams (dry basis) corn starch granules were slurried in water at 120° F. and a dilute solution of sodium hydroxide (0.5 N) was added to adjust the pH of the slurry to 10.5. Thereafter 210 ml. of 0.5 N sodium hydroxide were added followed by 10 grams of beta-diethylaminoethyl chloride hydrochloride. The alternate addition of alkali and amine continued until a total of 80 grams of amine had been added to the reaction slurry. Reaction was allowed to proceed for about 4 hours at 120° F. and thereafter the slurry pH was adjusted to about 4.5 with hydrochloric acid and the cationic starch granules were dewatered by filtration, washed and dried. During reaction the slurry pH did not exceed 12.0.

The cationic starch granules of the examples were analyzed with the following results:

*Table of analytical results*

| Example No. | 1 | 2 | 3 | 4 | 5 | 6 | 7 | 10 |
|---|---|---|---|---|---|---|---|---|
| Percent added Nitrogen (by weight) | 0.115 | 0.206 | 0.131 | 0.083 | 0.128 | 0.192 | 0.204 | 0.333 |
| Apparent D.S. (calculated) | 0.0133 | 0.0238 | 0.0153 | 0.0095 | 0.0150 | 0.0224 | 0.0236 | 0.0388 |
| Pasting Temperature cationic starch granules, °C | 69 | 60 | 66 | 69 | 64 | 60 | 61.5 | 57.5 |
| Maximum Viscosity | 915 | 700 | 890 | 584 | 788 | 1,432 | 1,320 | 1,175 |
| 20 Minute Viscosity | 288 | 15 | 160 | 196 | 112 | 640 | 304 | 320 |
| Gel | 39 | 11 | 20 | 94 | 18 | 2 | 43 | 66 |

In the table D.S. stands for degree of substitution which may be defined as the average number of hydroxyl groups replaced by the amine reagent for each ($C_6H_{10}O_5$) unit of starch. Pasting temperature and viscosities were determined with a Corn Industries Viscometer using a starch slurry containing 5.5% dry starch solids by weight. The gel strength was determined on the pastes by the standard testing method employed in the starch industry. In all cases pasting occurred at the low temperatures specified in the table of analytical results and the pastes were clear, cohesive and showed little tendency to gel. The cohesive non-gelling characteristics of the pastes make our product particularly useful in food products such as fruit pie fillings, salad dressings, gravies, sauces and frozen food preparations. Our starch derivatives are also useful in textile printing and sizing and as a paper coating or sizing and for ore flotation and the flocculation of many negatively charged materials. The cationic nature of our starch granules was shown by the fact that the granules absorbed negatively charged dyes from acid and neutral solutions and by the fact that our starch derivative adheres and forms a good bond with synthetic man-made fibers. This characteristic of our starch derivative makes it particularly useful as a finish in the weaving of synthetic fabrics.

EXAMPLE XI

Four hundred grams (dry basis) of potato starch granules were slurried in 700 ml. of water and heated to 120° F. About 0.12 mol of dilute ammonium hydroxide was added for each mol of starch followed by about 0.06 mol of beta-dimethylaminoethyl chloride hydrochloride. The pH of the slurry was about 10.8. The slurry was then gently agitated with stirring for about 2 hours at 120° F. and neutralized with hydrochloric acid to a pH of about 5.0. The slurry was then filtered to recover the cationic starch granules which were thereafter washed and dried.

The procedure and amounts of ingredients specified in Example XI may be used with the following specified ingredients.

| Example | Starch | Alkali | Amine Reagent |
|---|---|---|---|
| XII | Wheat | Potassium hydroxide | beta-diethylaminoethyl chloride hydrochloride. |
| XIII | Tapioca | Butyl amine | beta-diisopropylaminoethyl bromide hydrobromide. |
| XIV | Corn | Ethylene diamine | beta-diallylamino-ethyl chloride hydrochloride. |
| XV | Sago | Diethylenetriamine | beta-dimethoxyethyl aminoethyl chloride hydrochloride. |
| XVI | Corn | Dichloroethyl amine | Beta-dimethylamino 2-butyl chloride hydrochloride. |
| XVII | Wheat | Trisodium phosphate | Beta-dimethylamino 1,2-dimethylethyl chloride hydrochloride. |
| XVIII | Corn | Ammonium hydroxide | beta-dimethylamino 1-ethoxyethyl bromide hydrobromide. |
| XIX | Corn | Calcium hydroxide | beta-dimethylamino 2-benzoxyethyl chloride hydrochloride. |
| XX | Corn | Sodium hydroxide | beta-dimethylamino 2-methoxyethyl chloride hydrochloride. |

It will be understood that it is intended to cover all changes and modifications of the preferred embodiment of our invention herein chosen for the purpose of illustration which do not constitute departure from the spirit and scope of our invention.

What we claim is:

1. The method of manufacturing amine starch in granular form which comprises the steps of forming a slurry of starch granules in water, adding between about 0.0001 mol to 0.11 mol of dialkyl beta amine reagent for each mol of starch, adding alkali to the slurry in an amount between about 0.04 mol to 0.12 mol of alkali for each mol of starch to establish reaction between the amine reagent and starch granules in the absence of inhibitors against starch granule gelatinization, maintaining the reaction mixture at a temperature below that at which starch granules gelatinize until reaction is complete, then after reaction has taken place neutralizing the reaction slurry with a suitable acid to a pH below 9.0 and then dewatering the reaction slurry and washing the reaction product to recover amine starch in the form of granules, said beta amine reagent having the general formula

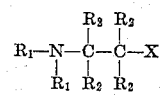

in which $R_1$ is selected from the group consisting of a $C_1$–$C_{18}$ alkyl radical, X is a halide having a molecular weight of at least 35 and $R_2$ is one of the group consisting of hydrogen and a $C_1$–$C_{18}$ alkyl radical.

2. The method of manufacturing amine starch in granular form which comprises the steps of forming a slurry of starch granules in water, adding between about 0.0001 mol to 0.11 mol of dialkyl beta amine reagent for each mol of starch, adding alkali to the slurry in an amount between about 0.04 mol to 0.12 mol of alkali for each mol of starch to establish reaction between the amine reagent and starch granules in the absence of inhibitors against starch granule gelatinization, maintaining the reaction mixture at a temperature below that at which starch granules gelatinize until reaction is complete, then after reaction has taken place neutralizing the reaction slurry with a suitable acid to a pH below 9.0 and then dewatering the reaction slurry and washing the reaction product to recover amine starch in the form of granules, said beta amine reagent having the general formula

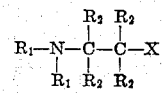

in which $R_1$ is a $C_1$–$C_{18}$ alkyl radical substituted with a member selected from the group consisting of a halide, ester, ether, acetal and non-reactive amine group, X is a halide having a molecular weight of at least 35 and $R_2$ is one of the group consisting of hydrogen and a $C_1$–$C_{18}$ alkyl radical.

3. The method of manufacturing amine starch in granular form which comprises the steps of forming a slurry of starch granules in water, adding between about 0.0001 mol to 0.11 mol of dialkyl beta amine reagent for each mol of starch, adding alkali to the slurry in an amount between about 0.04 mol to 0.12 mol of alkali for each mol of starch to establish reaction between the amine reagent and starch granules in the absence of inhibitors against starch granule gelatinization, maintaining the reaction mixture at a temperature below that at which starch granules gelatinize until reaction is complete, then after reaction has taken place neutralizing the reaction slurry with a suitable acid to a pH below 9.0 and then dewatering the reaction slurry and washing the reaction product to recover amine starch in the form of granules, said beta amine reagent having the general formula

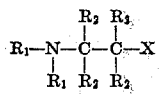

in which $R_1$ is a $C_1$-$C_{18}$ alkyl radical substituted with a member selected from the group consisting of a halide, ester, ether, acetal and non-reactive amine group, X is a halide having a molecular weight of at least 35 and $R_2$ is a $C_1$-$C_{18}$ alkyl radical substituted with a member selected from the group consisting of a halide, ester, ether, acetal and non-reactive amine group.

4. The method of manufacturing amine starch in granular form which comprises the steps of forming a slurry of starch granules in water, adding between about 0.0001 mol to 0.11 mol of dialkyl beta amine reagent for each mol of starch, adding alkali to the slurry in an amount between about 0.04 mol to 0.12 mol of alkali for each mol of starch to establish reaction between the amine reagent and starch granules in the absence of inhibitors against starch granule gelatinization, maintaining the reaction mixture at a temperature below that at which starch granules gelatinize until reaction is complete, then after reaction has taken place neutralizing the reaction slurry with a suitable acid to a pH below 9.0 and then dewatering the reaction slurry and washing the reaction product to recover amine starch in the form of granules, said beta amine reagent being selected from the group consisting of beta-dimethylaminoethyl chloride, beta-dimethoxyethyl aminoethyl chloride, beta-dimethylamino 1-ethoxyethyl bromide, beta-dimethylamino 2-methoxyethyl chloride, beta-dimethylamino 2-butyl chloride, beta-dimethylamino 1,2-dimethylethyl chloride, beta-dimethylamino 2-benzoxyethyl chloride, beta-dimethylaminoisopropyl chloride, beta-diethylaminoethyl chloride, beta-diisopropylaminoethyl bromide and beta-diisopropylaminoethyl chloride and the halogen acid salts thereof.

References Cited in the file of this patent

UNITED STATES PATENTS

| | | |
|---|---|---|
| 2,813,093 | Caldwell | Nov. 12, 1957 |
| 2,825,727 | Caldwell | Mar. 4, 1958 |
| 2,858,305 | Kerr | Oct. 28, 1958 |
| 2,876,217 | Paschall | Mar. 3, 1959 |